(No Model.)

L. L. MINCER
EYEGLASSES.

No. 534,803.  Patented Feb. 26, 1895.

Witnesses.
R. F. Osgood
C. R. Osgood

Inventor.
Louis L. Mincer

UNITED STATES PATENT OFFICE.

LOUIS L. MINCER, OF ROCHESTER, NEW YORK.

EYEGLASSES.

SPECIFICATION forming part of Letters Patent No. 534,803, dated February 26, 1895.

Application filed May 23, 1894. Serial No. 512,198. (No model.)

*To all whom it may concern:*

Be it known that I, LOUIS L. MINCER, of Rochester, in the county of Monroe and State of New York, have invented a certain new and useful Improvement in Eyeglasses; and I do hereby declare that the following is a full, clear, and exact description of the same, reference being had to the drawings accompanying this application.

My improvement relates to that class of eyeglasses in which the nose pieces or clamps are offset to stand at an angle to the plane of the glasses, and in which the lower ends of said nose pieces are free to enter the angle beneath the eyebrows and obtain a better hold on the nose. Such devices are well known.

The invention consists in the construction and arrangement of the nose pieces as hereinafter described and claimed, whereby they are adapted to be attached to glasses where the holding posts are set higher or lower with relation to the axis of the glasses.

Figure 1:
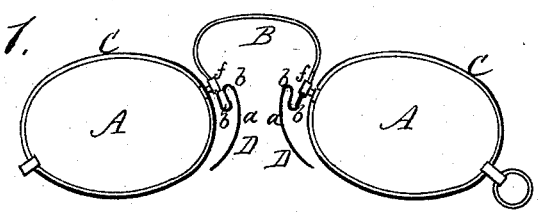
Figure 2:
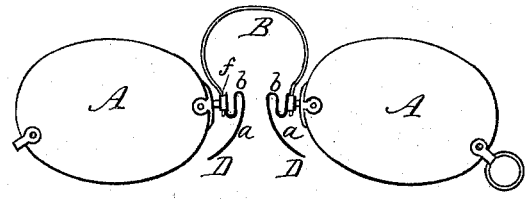
Figure 3:
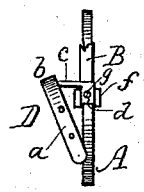
Figure 4:
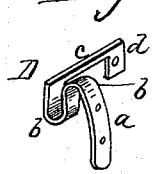
Figure 5:
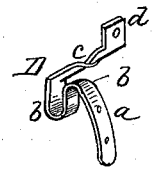
Figure 6:
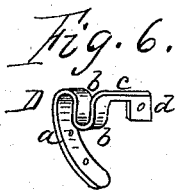

In the drawings—Figure 1 is a face view of a pair of framed eyeglasses showing my improvement. Fig. 2 is a similar view of an unframed or rimless pair of glasses. Fig. 3 is a diagram showing an edge view of one of the glasses and the nose piece attached thereto standing at an angle to the glass. Fig. 4 is a perspective view of one of the nose pieces with the bearing end turned downward to fit glasses where the holding post is low on the glass or frame. Fig. 5 is a similar view with the bearing piece turned upward to fit where the holding post is high on the glass or frame. Fig. 6 is a perspective view looking on the back or inner side.

A A indicate the lenses and B the connecting bow or spring, which may be of any of the known kinds. C C are the metallic frames or rims, which may or may not be used.

D, D, are the nose pieces or clamps. They are of that kind which stand at an angle to the plane of the glasses, being offset or set in at the top, whereby they are made to set into the cavity under the brows and fit more closely to the nose. They are attached at the top and free at the bottom, whereby the best elastic action and holding power are attained. The lower free part consists of a plate $a$ of sufficient length and width to fit the nose, and it may be used either uncovered or with pads of cork or other suitable substance to produce friction. They are made of various lengths to fit different posts. The upper portion of the nose piece is made with corrugations $b\ b$, and from the last bend a slender bar $c$ extends inward at right angles, and has at its extremity a square bearing block $d$, of small size, which fits into the square flanged socket piece $f$ of the holding post, and is secured in place by a small screw $g$. This screw may also hold the end of the bow that straddles the nose.

In those glasses in which the holding post comes low on the glasses, the bearing block $d$ is turned downward, as shown in Figs. 3 and 4; and in those where the holding post is high, it is turned upward, as shown in Fig. 5. The design of the slender cross bar $c$ is to enable this bearing block to be turned either up or down, which is done by twisting the bar, thereby enabling the nose piece to be attached to either kind of glasses. Heretofore, in order to fit the nose clamps to glasses having high and low holding posts, it has been necessary to make said clamps specially for each purpose and distinct from each other. It is a great advantage to make said clamps serve both purposes. Furthermore, the said slender cross bar $c$, being readily bent to any position up or down, or in and out, enables the pads to be shaped by the optician to fit a nose of any contour, and also to fit into the cavities of different depths under the eyebrows.

A nose piece attached at its upper end and free at its lower end is more effective than one attached at the lower end or at both ends; and the construction above described is such as to render it adjustable to any position by simply bending the slender portion of the device.

Having described my invention I do not claim broadly clamps set angularly to fit beneath the eyebrows. Nor do I claim broadly clamps having double bends or corrugations.

What I claim as new, and desire to secure by Letters Patent, is—

In eyeglasses the combination, with a rigid post provided with a flanged socket-piece attached to the frame, of a nose-clamp provided with a slender bar and a square bearing-block at the end of the bar, fitting between the flanges of the socket piece and secured by a screw, the bearing-block being capable of being reversed by twisting the bar, thereby adapting it to attachment to posts set higher or lower on the frame, as herein shown and described.

In witness whereof I have hereunto signed my name in the presence of two subscribing witnesses.

LOUIS L. MINCER.

Witnesses:
R. F. OSGOOD,
C. R. OSGOOD.